(12) United States Patent
Borge

(10) Patent No.: US 7,862,428 B2
(45) Date of Patent: Jan. 4, 2011

(54) INTERACTIVE ACTION FIGURES FOR GAMING SYSTEMS

(75) Inventor: Michael D. Borge, New Plymouth, ID (US)

(73) Assignee: Ganz, Woodbridge, Ontario ( * ) Notice: Subject to any disclaimer, the term of this patent is extended or adjusted under 35 U.S.C. 154(b) by 1167 days.

(21) Appl. No.: 10/884,002

(22) Filed: Jul. 2, 2004

(65) Prior Publication Data

US 2005/0059483 A1    Mar. 17, 2005

Related U.S. Application Data

(60) Provisional application No. 60/484,834, filed on Jul. 2, 2003.

(51) Int. Cl.
*A63F 9/24* (2006.01)
(52) U.S. Cl. .............................. 463/29; 463/32; 463/37
(58) Field of Classification Search .................. 463/39, 463/9, 42, 45, 29, 32, 37
See application file for complete search history.

(56) References Cited

U.S. PATENT DOCUMENTS

| | | | |
|---|---|---|---|
| 5,255,834 A | 10/1993 | Bendersky |
| 5,411,259 A | 5/1995 | Pearson |
| 5,544,320 A | 8/1996 | Konrad |
| 5,606,652 A | 2/1997 | Silverbrook |
| 5,659,692 A | 8/1997 | Poggio et al. |
| 5,682,469 A | 10/1997 | Linnett et al. |
| 5,684,943 A | 11/1997 | Abraham |
| 5,717,869 A | 2/1998 | Moran et al. |
| 5,736,982 A | 4/1998 | Suzuki et al. |

(Continued)

FOREIGN PATENT DOCUMENTS

CA    2475463 A1    8/2003

(Continued)

OTHER PUBLICATIONS neopets.com "The Ottawa Citizen" dated Feb. 7, 2000.

(Continued)

*Primary Examiner*—Peter DungBa Vo
*Assistant Examiner*—Omkar Deodhar
(74) *Attorney, Agent, or Firm*—Pearne & Gordon LLP

(57) ABSTRACT

An action figure is provided with a serial number that provides an access code which allows owners to engage in enjoyable games or other activities via the Internet or other gaming systems. The interactive action figure system comprises a toy, statue, or other three-dimensional figurine with a serial number, and preferably a computer network accessible over the internet and a particular gaming framework managed by a network device. Owners of action figure toys may "log onto" the network using the action figure serial number as an access code to activate a particular computer character identity and participate in games such as hand-to-hand combat games, action-adventure series, or learning games. The action figure may be, for example, a warrior, sports figure, doll or teddy bear to appeal to a wide range of users. Once a particular character is activated, game play proceeds according to preset rules. The game character's traits, powers, and other features may be enhanced or otherwise modified by purchasing preferably-three-dimensional accessories and inputting serial numbers into the gaming system that are also supplied with the accessories.

55 Claims, 4 Drawing Sheets

U.S. PATENT DOCUMENTS

| | | | |
|---|---|---|---|
| 5,802,296 | A | 9/1998 | Morse |
| 5,822,428 | A | 10/1998 | Gardner |
| 5,853,327 | A * | 12/1998 | Gilboa ........................ 463/39 |
| 5,880,731 | A | 3/1999 | Liles et al. |
| 5,886,697 | A | 3/1999 | Naughton et al. |
| 5,890,963 | A | 4/1999 | Yen |
| 5,923,330 | A | 7/1999 | Tarlton |
| 5,926,179 | A | 7/1999 | Matsuda et al. |
| 5,956,038 | A | 9/1999 | Rekimoto |
| 5,959,281 | A * | 9/1999 | Domiteaux ................ 235/454 |
| 5,964,660 | A | 10/1999 | James et al. |
| 5,966,526 | A | 10/1999 | Yokoi |
| 6,009,458 | A | 12/1999 | Hawkins et al. |
| 6,031,549 | A | 2/2000 | Hayes-Roth |
| 6,049,778 | A | 4/2000 | Walker |
| 6,057,856 | A | 5/2000 | Miyashita et al. |
| 6,072,466 | A | 6/2000 | Shah et al. |
| 6,081,830 | A | 6/2000 | Schindler |
| 6,159,101 | A | 12/2000 | Simpson |
| 6,173,267 | B1 | 1/2001 | Cairns |
| 6,175,857 | B1 | 1/2001 | Hachiya et al. |
| 6,200,216 | B1 | 3/2001 | Peppel |
| 6,210,272 | B1 | 4/2001 | Brown |
| 6,219,045 | B1 | 4/2001 | Leahy et al. |
| 6,227,931 | B1 | 5/2001 | Shackelford |
| 6,227,966 | B1 | 5/2001 | Yokoi |
| 6,251,017 | B1 | 6/2001 | Leason |
| 6,253,167 | B1 | 6/2001 | Matsuda |
| 6,267,672 | B1 | 7/2001 | Vance |
| 6,268,872 | B1 | 7/2001 | Matsuda et al. |
| 6,273,815 | B1 | 8/2001 | Stuckman et al. |
| 6,290,565 | B1 | 9/2001 | Galyean, III et al. |
| 6,290,566 | B1 | 9/2001 | Gabai et al. |
| 6,311,195 | B1 | 10/2001 | Hachiya |
| 6,352,478 | B1 | 3/2002 | Gabai et al. |
| 6,356,867 | B1 | 3/2002 | Gabai et al. |
| 6,368,177 | B1 | 4/2002 | Gabai et al. |
| 6,388,665 | B1 | 5/2002 | Linnett et al. |
| 6,394,872 | B1 | 5/2002 | Watanabe et al. |
| 6,406,370 | B1 | 6/2002 | Kumagai |
| 6,449,518 | B1 | 9/2002 | Yokoo et al. |
| 6,468,155 | B1 | 10/2002 | Zucker |
| 6,476,830 | B1 | 11/2002 | Farmer et al. |
| 6,493,001 | B1 | 12/2002 | Takagi et al. |
| 6,494,762 | B1 | 12/2002 | Bushmitch |
| 6,519,771 | B1 | 2/2003 | Zenith |
| 6,539,400 | B1 | 3/2003 | Bloomfield et al. |
| 6,554,679 | B1 | 4/2003 | Shackelfrod et al. |
| 6,559,863 | B1 | 5/2003 | Megiddo |
| 6,560,511 | B1 | 5/2003 | Yokoo et al. |
| 6,572,431 | B1 | 6/2003 | Maa |
| 6,587,834 | B1 | 7/2003 | Dixon, III |
| 6,595,858 | B1 | 7/2003 | Tajiri et al. |
| 6,609,968 | B1 | 8/2003 | Okada |
| 6,612,501 | B1 | 9/2003 | Woll et al. |
| 6,616,532 | B2 | 9/2003 | Albrecht |
| 6,650,761 | B1 | 11/2003 | Rodriguez et al. |
| 6,663,105 | B1 | 12/2003 | Sullivan et al. |
| 6,685,565 | B2 | 2/2004 | Tanibuchi et al. |
| 6,692,360 | B2 | 2/2004 | Kusuda |
| 6,704,784 | B2 | 3/2004 | Matsuda |
| 6,719,604 | B2 * | 4/2004 | Chan ........................ 446/297 |
| 6,720,949 | B1 | 4/2004 | Pryor et al. |
| 6,722,973 | B2 | 4/2004 | Akaishi |
| 6,729,884 | B1 | 5/2004 | Kelton |
| 6,734,884 | B1 | 5/2004 | Berry |
| 6,734,885 | B1 | 5/2004 | Matsuda |
| 6,735,324 | B1 * | 5/2004 | McKinley et al. ........... 382/100 |
| 6,739,941 | B1 | 5/2004 | Brownsberger |
| 6,758,678 | B2 | 7/2004 | Van Gilder et al. |
| 6,772,195 | B1 | 8/2004 | Hatlelid et al. |
| 6,773,325 | B1 | 8/2004 | Mawle et al. |
| 6,773,344 | B1 | 8/2004 | Gabai |
| 6,800,013 | B2 | 10/2004 | Liu |
| 6,813,605 | B2 | 11/2004 | Nakamura |
| 6,890,179 | B2 | 5/2005 | Rogan |
| 6,899,333 | B2 * | 5/2005 | Weisman ................ 273/289 |
| 6,910,186 | B2 | 6/2005 | Kim |
| 6,918,833 | B2 | 7/2005 | Emmerson |
| 6,944,421 | B2 | 9/2005 | Axelrod |
| 6,951,516 | B1 | 10/2005 | Eguchi et al. |
| 6,954,728 | B1 | 10/2005 | Kusumoto et al. |
| 6,959,166 | B1 | 10/2005 | Gabai |
| 7,037,166 | B2 | 5/2006 | Shrock et al. |
| 7,039,940 | B2 | 5/2006 | Weatherford |
| 7,042,440 | B2 | 5/2006 | Pryor |
| 7,054,831 | B2 | 5/2006 | Koenig |
| 7,058,897 | B2 | 6/2006 | Matsuda |
| 7,061,493 | B1 | 6/2006 | Cook |
| 7,066,781 | B2 | 6/2006 | Weston |
| 7,081,033 | B1 | 7/2006 | Mawle et al. |
| 7,086,005 | B1 | 8/2006 | Matsuda |
| 7,089,083 | B2 | 8/2006 | Yokoo et al. |
| 7,143,358 | B1 | 11/2006 | Yuen |
| 7,155,680 | B2 | 12/2006 | Akazawa et al. |
| 7,171,154 | B2 | 1/2007 | Fujisawa et al. |
| 7,179,171 | B2 | 2/2007 | Forlines |
| 7,181,690 | B1 | 2/2007 | Leahy et al. |
| 7,191,220 | B2 | 3/2007 | Ohwa |
| 7,208,669 | B2 | 4/2007 | Wells |
| 7,229,288 | B2 | 6/2007 | Stuart et al. |
| 7,249,139 | B2 | 7/2007 | Chuah et al. |
| 7,266,522 | B2 | 9/2007 | Dutta et al. |
| 7,288,028 | B2 | 10/2007 | Rodriquez et al. |
| 7,314,407 | B1 | 1/2008 | Pearson |
| 7,425,169 | B2 | 9/2008 | Ganz |
| 7,442,108 | B2 | 10/2008 | Ganz |
| 7,448,231 | B2 | 11/2008 | Jeanvoine et al. |
| 7,465,212 | B2 | 12/2008 | Ganz |
| 7,478,047 | B2 | 1/2009 | Loyall et al. |
| 7,488,231 | B2 | 2/2009 | Weston |
| 7,534,157 | B2 | 5/2009 | Ganz |
| 7,548,242 | B1 | 6/2009 | Hughes et al. |
| 7,568,964 | B2 | 8/2009 | Ganz |
| 7,604,525 | B2 | 10/2009 | Ganz |
| 7,618,303 | B2 | 11/2009 | Ganz |
| 7,677,948 | B2 | 3/2010 | Ganz |
| 2001/0020955 | A1 | 9/2001 | Nakagawa et al. |
| 2001/0031603 | A1 | 10/2001 | Gabai et al. |
| 2001/0039206 | A1 | 11/2001 | Peppel |
| 2002/0002514 | A1 | 1/2002 | Kamachi et al. |
| 2002/0022523 | A1 | 2/2002 | Dan et al. |
| 2002/0022992 | A1 | 2/2002 | Miller et al. |
| 2002/0022993 | A1 | 2/2002 | Miller et al. |
| 2002/0022994 | A1 | 2/2002 | Miller et al. |
| 2002/0026357 | A1 | 2/2002 | Miller et al. |
| 2002/0026358 | A1 | 2/2002 | Miller et al. |
| 2002/0036617 | A1 | 3/2002 | Pryor |
| 2002/0040327 | A1 | 4/2002 | Owa |
| 2002/0054094 | A1 | 5/2002 | Matsuda |
| 2002/0065746 | A1 | 5/2002 | Lewis |
| 2002/0065890 | A1 | 5/2002 | Barron |
| 2002/0068500 | A1 | 6/2002 | Gabai et al. |
| 2002/0082077 | A1 | 6/2002 | Johnson et al. |
| 2002/0090985 | A1 | 7/2002 | Tochner et al. |
| 2002/0094851 | A1 | 7/2002 | Rheey |
| 2002/0111808 | A1 | 8/2002 | Feinberg |
| 2002/0113809 | A1 | 8/2002 | Akazawa et al. |
| 2002/0119810 | A1 | 8/2002 | Takatsuka et al. |
| 2002/0130894 | A1 | 9/2002 | Young et al. |
| 2002/0147640 | A1 | 10/2002 | Daniele |
| 2002/0160835 | A1 | 10/2002 | Fujioka et al. |
| 2002/0161666 | A1 | 10/2002 | Fraki et al. |
| 2002/0168919 | A1 | 11/2002 | Perkins |

| | | | | | | |
|---|---|---|---|---|---|---|
| 2002/0169668 | A1 | 11/2002 | Bank et al. | JP | 2002297498 A | 10/2002 |
| 2002/0169672 | A1 | 11/2002 | Barnhart | JP | 2003016035 A | 1/2003 |
| 2002/0183119 | A1 | 12/2002 | Fessler | JP | 2003248650 A | 5/2003 |
| 2002/0198781 | A1 | 12/2002 | Cobley | JP | 2003205178 | 7/2003 |
| 2003/0018523 | A1 | 1/2003 | Rappaport et al. | JP | 2003210843 | 7/2003 |
| 2003/0034955 | A1 | 2/2003 | Gilder et al. | JP | 2003242058 A | 8/2003 |
| 2003/0055984 | A1 | 3/2003 | Shimakawa et al. | KR | 1073524 A | 8/2001 |
| 2003/0061161 | A1 | 3/2003 | Black | WO | 99/42917 A2 | 8/1999 |
| 2003/0088467 | A1 | 5/2003 | Culver | WO | 0033533 | 6/2000 |
| 2003/0126031 | A1 | 7/2003 | Asami | WO | 01/69572 A1 | 9/2001 |
| 2003/0220885 | A1 | 11/2003 | Lucarelli et al. | WO | 01/69829 A2 | 9/2001 |
| 2003/0222902 | A1 | 12/2003 | Chupin et al. | WO | 01/69830 A1 | 9/2001 |
| 2003/0232649 | A1 | 12/2003 | Gizis et al. | WO | 01/90841 A1 | 11/2001 |
| 2004/0030595 | A1 | 2/2004 | Park | WO | 02/22224 A1 | 3/2002 |
| 2004/0043806 | A1 | 3/2004 | Kirby et al. | WO | 0227591 A | 4/2002 |
| 2004/0046736 | A1 | 3/2004 | Pryor et al. | WO | 02/054327 A1 | 7/2002 |
| 2004/0053690 | A1 | 3/2004 | Fogel et al. | WO | 02099581 A2 | 12/2002 |
| 2004/0075677 | A1 | 4/2004 | Loyall et al. | WO | 03/034303 A1 | 4/2003 |
| 2004/0092311 | A1 | 5/2004 | Weston et al. | WO | 03026764 A2 | 4/2003 |
| 2004/0093266 | A1 | 5/2004 | Dohring | WO | 2005/064502 A1 | 7/2005 |
| 2004/0193489 | A1 | 9/2004 | Boyd | | | |
| 2004/0219961 | A1 | 11/2004 | Ellenby | | | |
| 2004/0229696 | A1 | 11/2004 | Beck | | | |
| 2004/0242326 | A1 | 12/2004 | Fujisawa et al. | | | |
| 2004/0259465 | A1 | 12/2004 | Wright et al. | | | |
| 2005/0043076 | A1 | 2/2005 | Lin | | | |
| 2005/0049725 | A1 | 3/2005 | Huang | | | |
| 2005/0059483 | A1 | 3/2005 | Borge | | | |
| 2005/0071225 | A1 | 3/2005 | Bortolin | | | |
| 2005/0114272 | A1 | 5/2005 | Herrmann et al. | | | |
| 2005/0137015 | A1 | 6/2005 | Rogers | | | |
| 2005/0177428 | A1 | 8/2005 | Ganz | | | |
| 2005/0192864 | A1 | 9/2005 | Ganz | | | |
| 2005/0250415 | A1 | 11/2005 | Barthold | | | |
| 2005/0250416 | A1 | 11/2005 | Barthold | | | |
| 2005/0272504 | A1 | 12/2005 | Eguchi et al. | | | |
| 2005/0287925 | A1 | 12/2005 | Proch et al. | | | |
| 2006/0035692 | A1 | 2/2006 | Kirby et al. | | | |
| 2006/0079150 | A1 | 4/2006 | Filoseta et al. | | | |
| 2006/0080539 | A1 | 4/2006 | Asami | | | |
| 2006/0093142 | A1 | 5/2006 | Schneier et al. | | | |
| 2006/0100018 | A1 | 5/2006 | Ganz | | | |
| 2006/0166593 | A1 | 7/2006 | Shrock et al. | | | |
| 2006/0285441 | A1 | 12/2006 | Walker | | | |
| 2007/0050716 | A1 | 3/2007 | Leahy et al. | | | |
| 2007/0143679 | A1 | 6/2007 | Resner | | | |
| 2008/0009350 | A1 | 1/2008 | Ganz | | | |
| 2008/0009351 | A1 | 1/2008 | Ganz | | | |
| 2008/0026666 | A1 | 1/2008 | Ganz | | | |
| 2008/0109313 | A1 | 5/2008 | Ganz et al. | | | |
| 2008/0134099 | A1 | 6/2008 | Ganz | | | |
| 2008/0163055 | A1 | 7/2008 | Ganz et al. | | | |
| 2009/0029768 | A1 | 1/2009 | Ganz | | | |
| 2009/0029772 | A1 | 1/2009 | Ganz | | | |
| 2009/0053970 | A1 | 2/2009 | Borge | | | |
| 2009/0054155 | A1 | 2/2009 | Borge | | | |
| 2009/0063282 | A1 | 3/2009 | Ganz | | | |
| 2009/0118009 | A1 | 5/2009 | Ganz | | | |
| 2009/0131164 | A1 | 5/2009 | Ganz | | | |
| 2009/0204420 | A1 | 8/2009 | Ganz | | | |
| 2010/0151940 | A1 | 6/2010 | Borge | | | |

FOREIGN PATENT DOCUMENTS

| | | |
|---|---|---|
| DE | 10304779 A1 | 7/2003 |
| EP | 1228792 A1 | 8/2002 |
| JP | 200057373 A | 2/2000 |
| JP | 2001222585 A | 8/2001 |
| JP | 2001321571 A | 11/2001 |
| JP | 2001283024 A | 12/2001 |
| JP | 2002016171 | 1/2002 |
| JP | 2002-134481 A | 5/2002 |
| JP | 2002134481 | 5/2002 |

OTHER PUBLICATIONS neopets.com "The Toronto Star" dated Mar. 13, 2003.
monopets.com "registration page", archive dated Dec. 12, 2002.
http://www.lego.com, Feb. 6, 2003, archive version found on www.archive.org- "Wayback Machine".
Grace, "Web Site Tycoon's Next Goal: Sixth Grade; Internet Pet Site Tallies 5 Million Visits A Month," Woonsocket Call, Jun. 19, 2002.
http://web.archive.org.web.20031202190119/www.monopets.com/, Dec. 2, 2003.
Johnson, M.P., et al., Sympathetic Interfaces: Using a Plush Toy to Direct Synthetic Characters. Proceedings of the CHI 99 Conference on Human Factors in Computing Systems, 1999.
"The Sims Booklet," dated 2000.
"The Sims 10th Anniversary", http://thesims2.ea.com/, dated Feb. 26, 2010.
PC Magazine, "The Sims Online Arrives," dated Dec. 18, 2002.
Prima's Official Strategy Guide—The Sims, dated 2000.
"The Sims", http://en.wikipedia.org/wiki/, retrieved Feb. 6, 2010.
CNET News, "Who Let the Neopets out?" dated Feb. 26, 2002.
Neopets The Official Magazine, dated Nov. 18, 2003.
Neopian Hospital, retrieved Mar. 24, 2010.
Pojo's Unofficial Guide to Neopets, 2003.
Neopets—Archeology, retrieved Mar. 25, 2010.
Nothing but Neopets, "Neopian History.", retrieved Mar. 24, 2010.
The Neopian Times, Week 32, retrieved Mar. 25, 2010.
The Neopian Times, Week 42, retrieved Mar. 25, 2010.
The Helpful Neopian, retrieved Mar. 25, 2010.
Nothing but Neopets, "Dec. 2002".
The Sims: News, "Details about Makin Magic," Jul. 11, 2003.
U.S. Appl. No. 12/707,055, filed Feb. 17, 2010.
Monopets, "The Gurgle," plush toy, undated, (photographs taken Aug. 2007).
Office Action from Reexam dated Aug. 19, 2010.
Action Closing Prosecution of Inter Partes Reexamination of U.S. Patent No. 7,677,948 Date = Sep. 14, 2010.
Action Closing Prosecution of Inter Partes Reexamination of U.S. Patent No. 7,568,964 Date = Sep. 8, 2010.
TelecomWorldwide et al; "Product Sidewire", Newsletter, Oct. 10, 1995, M2 Communications ISSN: 1363-9900.
International Search Report for PCT/CA2004/002206 dated May 2, 2005.
Microsoft et al; "Microsoft announces launch date for UltraCorps-second premium title for the Internet Gaming Zone Oblivion", M2 presswire, Newswire; Trade, May 28, 1998.
Japanese Patent Office, Decision of Refusal, Japanese Application No. 2006-545875, Dated Feb. 18, 2009.
Second Request for Reexamination of U.S. Patent No. 7,618,303 - with Exhibits B, C, D, E, F, L and M; dated Aug. 24, 2010.
Order Granting Request for Inter Partes Reexamination of U.S. Patent No. 7,677,948; dated Jul. 9, 2010.

Order Granting Request for Inter Partes Reexamination of U.S. Patent No. 7,604,525; dated Jul. 9, 2010.
Order Granting Request for Inter Partes Reexamination of U.S. Patent No. 7,568,964; dated Jul. 10, 2010.
Request for Reexamination of U.S. Patent No. 7,677,948 - with Exhibits B,C,D,E,O,P,Q,R,S,T; dated Apr. 20, 2010.
U.S. Copyright Registrations for The Sims expansion packs; dated Apr. 20, 2010.
Request for Reexamination of U.S. Patent No. 7,618,303 - with Exhibits B, C, D, E, M, N, and O; dated Apr. 20, 2010.
Request for Reexamination of U.S. Patent No. 7,604,525 - with Exhibits H, I, J, K, L, X, and Y; dated Apr. 20, 2010.
Request for Reexamination of U.S. Patent No. 7,568,964 - with Exhibits B, C, N, O, R, S; dated Apr. 20, 2010.

* cited by examiner

# INTERACTIVE ACTION FIGURES FOR GAMING SYSTEMS

This application claims priority of provisional application Ser. No. 60/484,834, filed Jul. 2, 2003, which is incorporated herein by this reference.

BACKGROUND OF THE INVENTION

1. Field of the Invention

This invention relates generally to gaming platforms available on the Internet, computer CDs, or other gaming systems. More specifically, this invention relates to an action figure and/or three-dimensional accessories that include access codes enabling users to engage in various games and activities wherein the particular action figure and accessories are reflected in an electronic identity corresponding to the access codes.

2. Related Art

The advancement of the Internet has brought about many opportunities for users to engage in games and other activities including those in which individual users compete against one another. These games and activities allow users to interact in various capacities. For example, some gaming platforms allow users to play simple card games against one another, while others allow Internet users to compete against their peers in action and/or adventure simulations such as those in which various characters duel in hand-to-hand combat.

In U.S. Pat. No. 5,964,660 (James et al.) an Internet gaming system is disclosed that allows a large number of computer users running a Web browser to play a game via the network. Users input moves and become apprised of the state of the game, using the basic input/output functions of their browser.

U.S. Pat. No. 6,276,672 B1 (Vance) teaches a remotely accessible game, such as an Internet game, to encourage consumers to purchase specific products. When a product like a bottle of water is purchased, an access code is provided inside the label or beneath the cap. Using the access code as a login password, consumers may take part in a particular game.

US Patent Application No. US2002/0183119 A1 (Fessler) describes an external game enhancer that may be used with an electronic gaming system. The game enhancer may be a small plug-in external item, containing storage memory, which can be quickly and directly connected to the electronic gaming platform so that the memory is accessible by the gaming machine when the game is played. The game enhancer may be built into a toy or consumer product like a key chain.

U.S. Pat. No. 6,616,532 B2 (Albrecht) also describes a game enhancement system that provides a consumer product with a memory device that may be transferred to the game memory for enhancing the functionality of the electronic game. Alternatively, a pass word for enhancing the functionality of the electronic game may be provided to a consumer upon purchase of a product.

SUMMARY OF THE INVENTION

The invention comprises a gaming platform and/or an action figure adapted to interact with the gaming platform. The characteristics of a computer game character are related to a customizable action figure that may, in itself, be a source of entertainment or a display item for users even when said users are not connected to the gaming platform. The customizable action figure may provide access for game users to participate remotely in games and/or other activities via the Internet or other computer or game programs. Alternatively or additionally, the customizable action figure may allow game users to enhance the character/team, for example, by changing their characteristics, such as attributes, powers, weapons, equipment, experience points, levels, feats, strengths, weaknesses, etc. This access and/or enhancement may be provided by inputting, into the gaming platform, one or more serial numbers that are associated with the action figure and/or accessories for the action figure. Preferably, the gaming platform is adapted to save the character with its enhanced attributes, so that the user may later return to the game with the character in the same condition as when the user left the game. The action figure may provide not only access or enhancement to an enjoyable activity via its interaction with the Internet or other gaming platform, but also a source of entertainment in its physical, toy form.

DETAILED DESCRIPTION OF THE INVENTION

Figure 1:
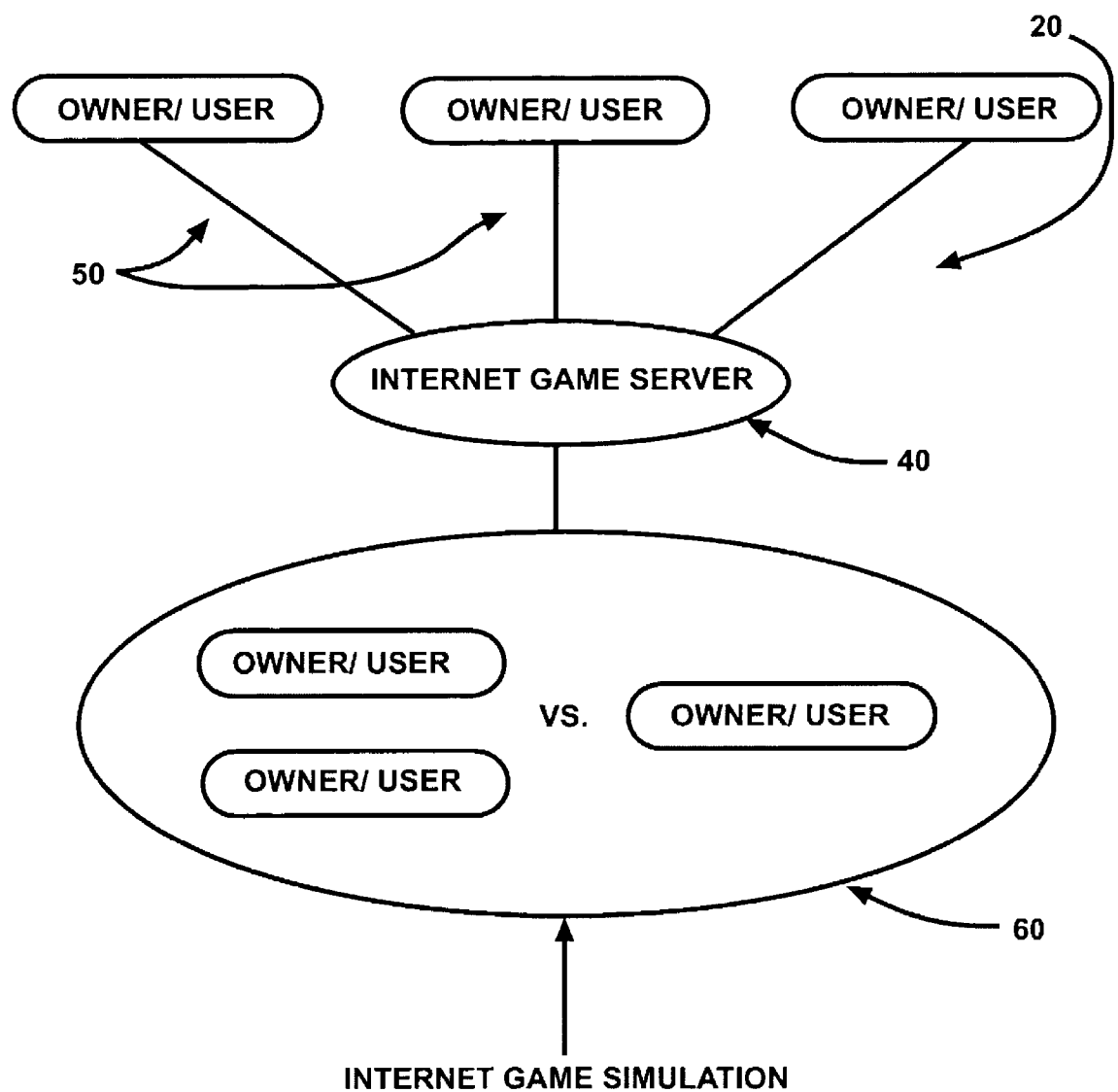
FIG. 1 is a schematic view of one embodiment of an invented interactive gaming platform accessible via the Internet.

In preferred embodiments of the invention, each action figure corresponds to a different computer identity, or character, in a variety of different gaming platforms managed by remote servers, and/or in other computer or game programs. When the action figure and/or programming is designed and/or manufactured, information based on the physical attributes of the action figure is programmed into the server/program to create the particular character identity in the gaming platform. A serial number is provided on or with the action figure, either on a surface of the action figure or in the packaging for the action figure. For example, the serial number may be provided by etching, molding, or adhesive or tied-on label. Alternatively, the serial number may be provided by including it on or inside the packaging for the action figures, for example, on a tag, sheet, or ID tag inside the box. Preferably, the serial number is not visible from the outside of the packaging, so that a consumer may not see or record the serial number until he/she purchases the action figure and opens the packaging. The serial number may be a number and/or letters, and may or may not convey, when simply read or viewed by the consumer, information about the character, accessory, or characteristic. For example, a serial number may be styled such as: 1035589, SM1035589, SUPERMAN-STRENGTH1035589, 4011856, H4011856, HEALTH4011856, etc. Any number of action figures may be supplied with a single serial number. For example, different superhero action figures preferably will have different serial numbers, for example, one serial number for all Spiderman™ action figures, and a different serial number for all Green Goblin™ action figures. Or, a certain portion of a single superhero may have one serial number and another portion of that same superhero may have a different serial number. Or, every action figure may have a different serial number. Other systems of serial numbers may be designed.

When the action figure is purchased, the owner of the action figure uses the serial number provided with the action figure as an access code to 1) access a game/activity; and/or 2) access a character in the game/activity, depending on the embodiment of the gaming platform. The programming and instructions may instruct the owner to input all of the serial number, or a portion of the serial number (such as the numbers only). Once the game and/or the character is activated, the character may, for example, compete against similar characters, embark on an adventure alone, or join a team of other characters in a competition or adventure.

Further, owners of such action figures may modify/enhance their game platform characters by purchasing accessories, each of which preferably is also provided with a serial number. Upon registering the serial numbers of the various accessories with a particular electronic character, by inputting the accessory serial number into the gaming platform, these accessories become part of the identity of the game character for future use. These accessory items, for example, may be items or attributes, to make a character stronger, more dangerous, live longer, brandish different weapons, etc.

The action figures are preferably three-dimensional figures, in the form of miniature humans, superheros, animals, gods, mythical persons or beasts, robots, for example. Preferably, each of the action figures has visible features, such as body parts; hair, fur, feathers; clothing or armor; facial expressions; logos; or other features that make the action figure identifiable. These features may be molded, painted, attached or otherwise connected or provided on the action figure. The action figures may or may not have joints, bending limbs or parts, or other moveable parts. Some or all of these features are the information that is programmed into the character in the gaming system, at least to an extent that the viewer/player of the game, once the game character is accessed (preferably by the serial number on the three-dimensional action figure), recognizes that the character is the same person/animal/entity as the action figure. So, the action figure may be said to "visually correspond" to the electronic/computer game character, or to "be in the likeness of" the electronic/computer game character, and vice versa. Thus, the three-dimensional, physically tangible action figure has a substantial resemblance to the two-dimensional, digital character in the computer/game.

The "accessories" described above are preferably also three-dimensional, physically tangible items, purchased at a store, through a catalog, over the Internet, or otherwise acquired. The accessories preferably are items that are miniatures of items that the action figure may be dressed in, ride on or in, fight with, or otherwise use in a hand, paw, claw, etc. Such items would be armor, leather couplets, chain mail, helmets, swords, guns, knives, laser weapons, grenades, horses, motorcycles, tanks, helicopters, etc. Thus, these items have a substantial resemblance to the enhancement that is being unlocked by the item's serial number, and these items may be attached to, held by, or mounted by, the action figure. Alternatively, the accessories may be items that are symbols of less tangible traits, such as health, strength, courage, wisdom, intelligence, weakness, etc. Such accessories may be a medallion or badge shaped like a small clenched fist for "strength"; a heart-shaped medallion or badge for "health"; a book-shaped medallion or badge for "wisdom", for example. Preferably, the accessory representing the less tangible trails are medallions or badges or other forms that can be attached to the action figure and that are sized appropriately for the size of the action figure. Other shapes or forms may be used, such as a plate, a banner, a tag, or simply an item to be placed beside the action figure. As with the action figure, the serial number may be applied directly onto the accessory item or in or on packaging for the accessory. As with the action figure, preferably the serial number is not visible to the consumer/owner until he or she opens the package.

Each time game play is suspended, information regarding the changing characteristics of the game "player" (the character) is stored on the server so that each time the game is accessed the most current "player" is retrieved. If there is only one game "player" active in a game, the user may stop play at any time and save his or her information. When more than one user is involved, play may be halted at any break in the action or at such point all users agree to stop. At some time in the course of game play, the character may become weaker or die. At this point, owners of the action figure may purchase additional strength or lives for their character or pay to have their character resurrected or cloned so that they can continue playing the game.

Referring now to the figures, an embodiment of an interactive action FIG. 10 for use with Internet gaming platforms 20 is illustrated. The interactive action figure comprises an action figure toy 10 which contains a serial number 25 corresponding to a specific computer identity or game character 30. The character 30 may be brought to life within a specific gaming network using the serial number 25 as a first access code. Providing the required access code 25 to the appropriate network server 40 or managing device activates the particular character 30 within the gaming framework. Once activated, the character 30 proceeds in the game according to the rules of the game. For example, the character 30 may compete in hand-to-hand combat against another similar character or embark upon an adventure alone.

Preferably, the invented interactive action FIG. 10 may take many physical forms to appeal to a wide range of users. For example, the action figure may be a warrior, a sports figure, a casino gambler, a doll, or a teddy bear. The specific gaming platform may then be designed around the particular figure and its intended audience. For example, a teddy bear may be intended for children and an appropriate computer identity may embark on an adventure that teaches valuable skills or lessons along the way. Alternatively, a warrior may appeal to a more adult audience. Consequently, its character may participate in a street fight or other intense or dangerous competition.

In a preferred embodiment, the gaming platform connects (50) a large number of individual users owning action figures and their corresponding computer identities, as shown in FIG. 1. Within the gaming platform, the characters may be formed into teams to compete in, for example, a soccer game, rugby competition, or a war (60). However, connecting users is not necessary so long as the individual user may access the appropriate computer identity using the action figure serial number and engage in an enjoyable activity via the Internet. Preferably, a centralized management device continually stores and updates character information as game play proceeds so that users may quit at any time and return to the game later and retrieve the most "current" computer identity for their action figure. For example, if a user completes a level in a game, this information would be stored and the user would not have to return to this level in the future. Preferably, where many users are active in a single game, users may quit at any time there is a break in play or when all users agree to suspend play.

Figure 2:
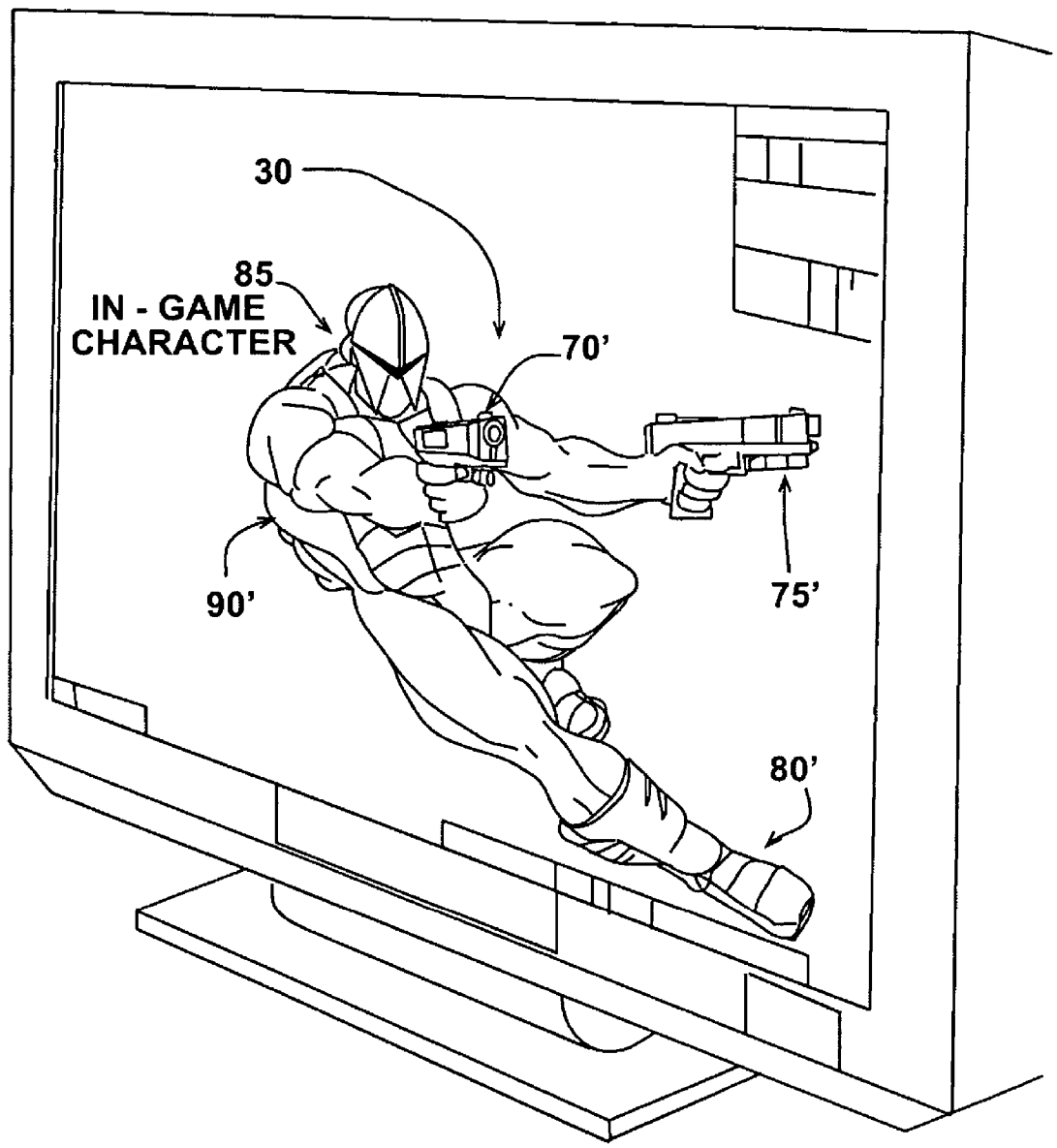
FIG. 2 is a perspective view of one embodiment of the invented interactive action figure in an Internal gaming platform, displayed on a computer screen.
Figure 3:
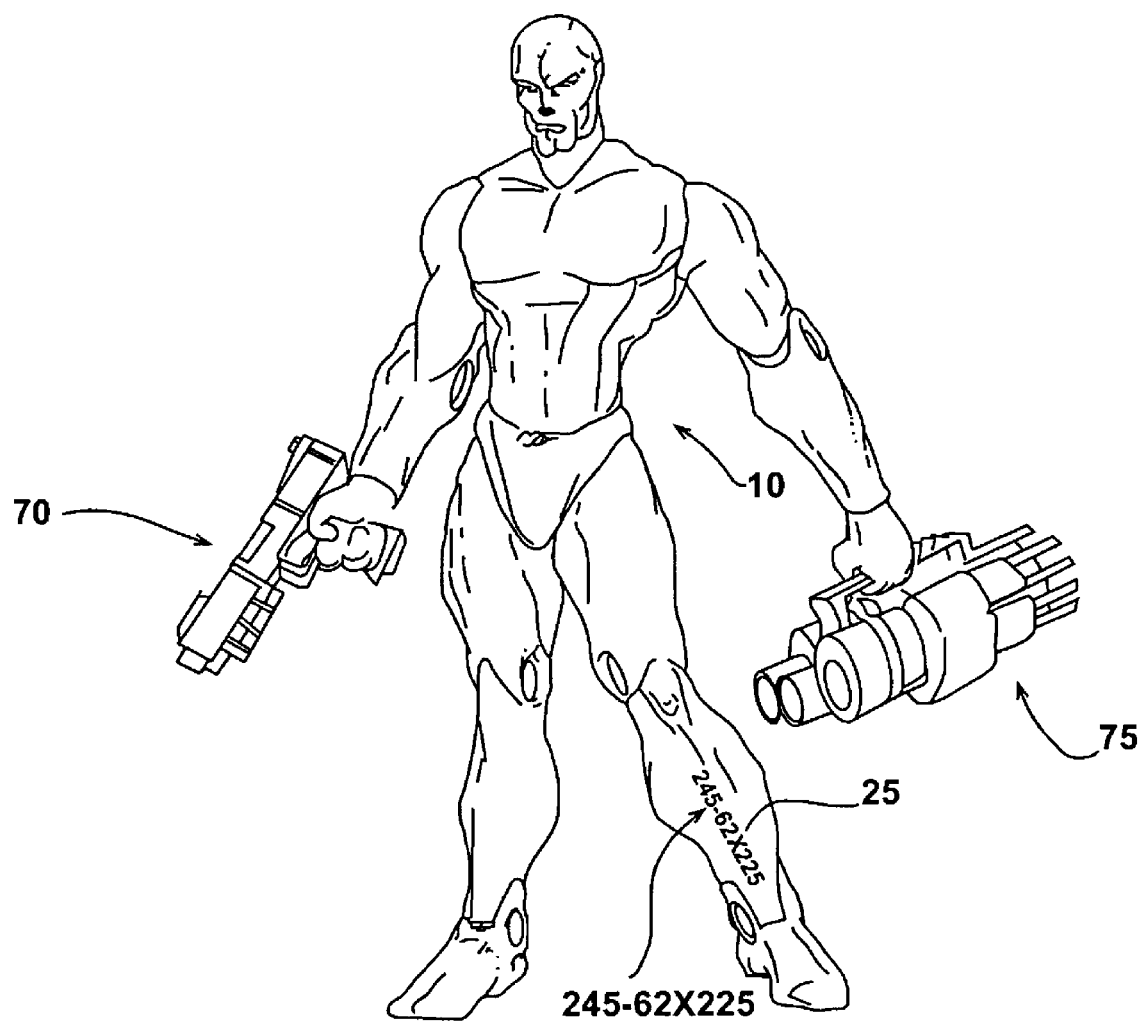
FIG. 3 is a perspective view of one embodiment of an action figure holding two accessories, and having a serial number on the leg surface (which is shown enlarged to the side of the leg).
Figure 4A:
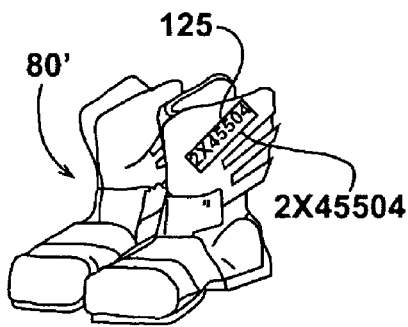
FIGS. 4A, 4B, 4C, 4D, and 4E illustrates embodiments of some possible accessories that may be purchased for the action figure of FIG. 3, and that may have their serial numbers input into the gaming platform of FIG. 1 to modify/enhance the game character of FIG. 2.
Figure 4B:
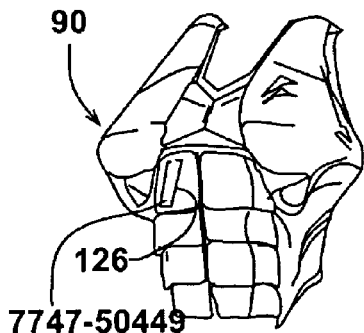
Figure 4C:
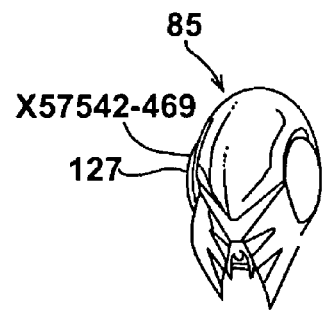
Figure 4D:
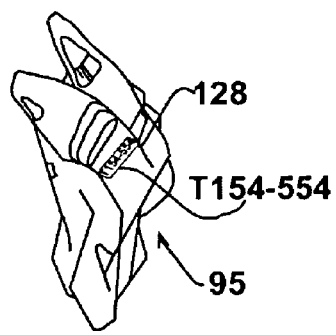
Figure 4E:
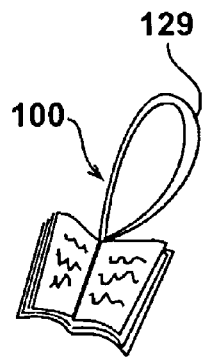

One of many possible embodiments of an invented interactive action FIG. 10 on the Internet is depicted in FIG. 2. This action FIG. 10 is shown in FIG. 3 in his basic form, with two weapon accessories 70, 75 already added. Additional accessories are shown in FIGS. 4A-4E, including boots 80, chest armor 90, face mask 85, arm armor 95, and wisdom (book) accessory 100. One may note the close resemblance between the action FIG. 10 in FIG. 3 and the game character 30 of FIG. 2, wherein the character has been enhanced with weapon accessories 70', 75', and boot 80', face mask 85', and chest armor 90' accessories).

As game play proceeds, users may update or modify their computer characters by purchasing accessories for their action figures, for example, according to the above description of accessories. Preferably, each accessory item has a serial number (125, 126, 127, 128, 129) or "secondary access code" with which it is associated, either by attaching or implanting the serial number to or in the accessory item, or by placing the serial number inside the packaging. After inputting the first access code (preferably the action figure's serial number) into the network managing system, one or more secondary access codes may be input to update the existing computer character identity. As described above, such accessory items may be intangible; for example, an individual may purchase accessory items that represent additional lives for their computer character or strength enhancers that bolster their chances of success. Alternatively, the accessory items may be physical items or equipment such as weapons or clothing as shown in FIG. 3. Inputting secondary codes for accessory items prompts the network managing system to associate these items with the computer identity corresponding to the first access code.

At some point in the course of game play, a specific character may expire within a particular gaming platform. For example, a character may die in the midst of a battle or come to the end of a particular journey after all preceding levels have been passed. If this occurs, an action figure owner may pay to have their character revived (for example, resurrected, cloned, or refreshed). This revival procedure may involve purchasing another action figure with an additional/updated serial number, or purchasing another serial number without buying another action figure via a revival product or service associated with the particular character, which may be distributed after payment is made to the manufacturer of the action figures or the manager of the gaming system.

While the preferred embodiments are described as being adapted for use in an Internet gaming platform, other gaming platforms may be used. For example, computer CD games, or gaming systems of the types represented by the popular PS2™ or X-box™ systems, might be adapted for use in embodiments of the invention. For example, such systems may be adapted to accept input of serial numbers to unlock games, characters, and/or characteristics of the characters, such as traits, weapons, weaknesses, etc. Therefore, while the current preferred embodiments include multiple users of Internet games, other embodiments and especially future embodiments may include non-Internet gaming systems for one or more users.

Although this invention has been described above with reference to particular means, materials, and embodiments, it is to be understood that the invention is not limited to these disclosed particulars, but extends instead to all equivalents within the scope of the following claims.

I claim:

1. A gaming system comprising:
    a first three-dimensional figure;
    a first primary access code packaged with the first figure, said first primary access code including a serial number formed of numbers and/or letters, and in a way that allows reading said serial number by a user; and
    an interactive gaming platform which carries out game play with a first character and which displays an image of said first character as part of said game play, and allows controlling a movement of said first character as part of said game play, said gaming platform accepting entry of said serial number via a user interface, and said interactive gaming platform restricting said game play of said first character unless the numbers and/or letters of the first primary access code are manually entered into a user interface of the gaming platform, wherein
    said gaming platform stores characteristics of the first character that effect said game play, and allows changing said characteristics by accepting a secondary access code via said user interface, where accepting the secondary access code changes said characteristics of said first character, wherein the image of said first character displayed by the gaming platform has an appearance that has a substantial resemblance to the first three-dimensional figure.

2. The gaming system of claim 1, wherein the first figure and first primary access code are packaged in such a manner that the primary access code cannot be visually seen and read by an outside observer until a package containing the first figure and the primary access code is opened but can be visually seen and read once the package is opened.

3. The gaming system of claim 2, wherein the gaming platform comprises a computer network.

4. The gaming system of claim 3, wherein the computer network is the Internet.

5. The gaming system of claim 4, further comprising:
    a figure accessory; and
    wherein said secondary access code is packaged with the figure accessory; wherein
    the gaming platform is further adapted to grant an ability to the first character responsive to the secondary access code being entered into a user interface of the gaming platform.

6. The gaming system of claim 5 wherein
    the gaming platform is further adapted to change the appearance of the first character responsive to the access code being entered into the gaming platform so that the first character has an appearance similar to that of the first figure with the accessory placed on the first figure.

7. The gaming system of claim 4, further comprising:
    a second three-dimensional figure; and
    a second primary access code packaged with the first figure; wherein
    the gaming platform is adapted to restrict play of a second character unless the second primary access code is entered into the gaming platform.

8. The gaming system of claim 1, further comprising:
    a second three-dimensional figure; and
    a second primary access code packaged with the second figure; wherein
    the gaming platform is adapted to restrict play of a second character unless the second primary access code is entered into the gaming platform.

9. The gaming system of claim 7, wherein the gaming platform is a sports game.

10. The gaming system of claim 7, wherein the gaming platform is a fighting game.

11. The gaming system of claim 1, wherein said characteristics include one or more of attributes, powers, weapons, equipment, experience points, levels, feats, strengths, and/or weaknesses.

12. A gaming system comprising:
an interactive gaming platform comprising a first character and programming which carries out game play with said first character and restricts play of the first character in a game interacting with the interactive gaming platform unless a first primary access code is inputted into the gaming platform, wherein the first primary access code is packaged with a first three-dimensional figure; and
a second character and programming that restricts play of the second character unless a second primary access code is inputted into the gaming platform, wherein the second primary access code is packaged with a second three-dimensional figure, wherein
said first character interacts with said second character during playing a game, wherein the gaming platform further comprises programming which stores an ability score of the first character that represents an ability of the first character to carry out some action and where said ability score can be changed for said first character by manually entering a secondary code formed of letters and/or numbers for said first character that changes said ability score.

13. The gaming system of claim 12, wherein the ability scores represent a strength of first character in said game.

14. The gaming system of claim 13, wherein the secondary access code is packaged with a figure accessory.

15. The gaming system of claim 12, wherein the secondary access code is packaged with a figure accessory.

16. The gaming system of claim 12, wherein the gaming platform is a sports game.

17. The gaming system of claim 16, wherein the gaming platform further comprises programming which causes play to end after a predetermined period of time.

18. The gaming system of claim 17, wherein
the gaming platform further comprises programming which causes play to resume responsive to a secondary access code being inputted into the gaming platform, wherein
the secondary access code is packaged with a figure accessory.

19. The gaming system of claim 17, wherein the gaming platform further comprises programming which causes play to resume responsive to a payment being made to a manager of the gaming platform.

20. The gaming system of claim 12, wherein the gaming platform is a fighting game.

21. The gaming system of claim 20 wherein the gaming platform further comprises programming to grant the character a fighting ability responsive to the secondary access code being inputted into the gaming platform.

22. The gaming system of claim 12, wherein the first primary access code is further packaged with software.

23. The gaming system of claim 12, wherein the first primary access code is printed on the figure.

24. The gaming system of claim 1, wherein said secondary access code changes a chance of success of the first character in said game play.

25. The gaming system of claim 1, wherein the gaming platform further comprises programming which causes play to end automatically after a predetermined period of time.

26. The gaming system of claim 25, wherein
the gaming platform further comprises programming which allows said game play to resume responsive to a secondary access code being manually entered into the gaming platform.

27. A method of playing a game comprising the steps of:
manually inputting a first primary access code into a user interface of a computer that is operating to play the game, where said first primary access code is packaged with a first three-dimensional figure that has a form selected from the group consisting of human, superhero, animal, god, mythical person, mythical beast, and robot;
playing an electronic game, using the computer, utilizing a first character resulting from said inputting of the first primary access code;
manually inputting a secondary access code into the user interface of the computer, where said secondary access code is packaged with a figure accessory; the computer operating the electronic game changing a characteristic of the character in a way that changes a chance of success of the first character in said playing a game, as a result of said inputting the secondary access code, automatically ending play after a certain period of time, the system accepting the first user manually inputting another access code into the user interface of the computer, where said another access code is packaged with another figure accessory; and said another access code automatically resuming play for an extended period of time.

28. A gaming system comprising:
a first three-dimensional figure;
a first primary access code packaged with the first figure;
an interactive gaming platform which is adapted to restrict play of a first character corresponding to the first figure unless the first primary access code is entered into the gaming platform;
a figure accessory; and
a secondary access code packaged with the accessory; wherein
the gaming platform being further adapted to grant an additional ability to the first character, beyond abilities that were obtained when the first primary access code is entered into the gaming platform, based on the secondary access code being entered into the gaming platform, wherein the first character has an appearance which is similar to the first figure, and
wherein the first primary access code is of a type that can be read by a user and the system accepting the user manually entering said code into the interactive gaming platform, and said first figure and first primary access code are packaged in such a manner that the primary access code cannot be seen by an outside observer until a package containing the first figure and the primary access code is opened.

29. The gaming system of claim 28, wherein the first primary access code is written on the first figure.

30. A gaming system comprising:
a first three-dimensional figure;
a first primary access code packaged with the first figure, first primary access code is of a type that can be read by a user;
an interactive gaming platform allowing manual entry of access codes into the interactive gaming platform, and which is adapted to restrict play of a first character unless the first primary access code is manually entered into the gaming platform;
a figure accessory; and
a secondary access code packaged with the accessory, said secondary access code being of a type that can be read by a user; wherein
the gaming platform is further adapted to change an appearance of the first character based on the secondary access code being manually entered into the gaming platform, said appearance being changed such that the first character has an appearance similar to that of the first figure with the accessory placed on the first figure.

31. The gaming system of claim 30, wherein the first figure and first primary access code are packaged in such a manner that the primary access code cannot be seen by an outside observer until a package containing the first figure and the primary access code is opened.

32. The gaming system of claim 31, wherein the first primary access code is written on the first figure.

33. The gaming system of claim 30, wherein the gaming platform comprises a computer network.

34. The gaming system of claim 33, wherein the computer network is the Internet.

35. The gaming system of claim 30, wherein the gaming platform is a sports game.

36. The gaming system of claim 30, wherein the gaming platform is a fighting game.

37. The gaming system of claim 30, wherein said first character includes a characteristic including one or more of attributes, powers, weapons, equipment, experience points, levels, feats, strengths, and/or weaknesses.

38. A gaming system comprising:
a first three-dimensional figure;
a first primary access code packaged with the first figure;
an interactive gaming platform which allows play of a first character responsive to the first primary access code being entered into the gaming platform, and allows interactive play by said first character responsive to said first primary access code being entered into the gaming platform;
a second three-dimensional figure; and
a second access code packaged with the first figure; wherein
the gaming platform allows play of a second character responsive to the second primary access code being entered into the gaming platform, and wherein said first and second characters play by interacting with one another responsive to both said first and second primary access codes having been entered into the gaming platform, wherein the gaming platform further comprises programming which causes play to end after a predetermined period of time after entry of only said primary access code, and wherein
the gaming platform further comprises programming which causes play to resume responsive to a secondary access code being inputted into the gaming platform.

39. The gaming system of claim 38, wherein the first character has an appearance which is similar to the first figure.

40. The gaming system of claim 38, wherein the first figure and first primary access code are of a type that can be read by a user and are packaged in such a manner that the primary access code cannot be seen by an outside observer until a package containing the first figure and the primary access code is opened.

41. The gaming system of claim 40, wherein the first primary access code is written on the first figure.

42. The gaming system of claim 38, wherein the gaming platform comprises a computer network.

43. The gaming system of claim 42, wherein the computer network is the Internet.

44. The gaming system of claim 38, wherein the gaming platform is a sports game.

45. The gaming system of claim 38, wherein the gaming platform is a fighting game.

46. The gaming system of claim 38, wherein said first character includes a characteristic including one or more of attributes, powers, weapons, equipment, experience points, levels, feats, strengths, and/or weaknesses.

47. A gaming system comprising:
a first three-dimensional figure;
a first primary access code packaged with the first figure;
wherein the first figure and first primary access code are packaged in such a manner that the primary access code is of a type that can be read by a user but cannot be seen by an outside observer until a package containing the first figure and the primary access code is opened, and can be seen by the outside observer after the packaging is opened;
an interactive gaming platform which is adapted to restrict play of a first character in a game unless the first primary access code is entered into the gaming platform;
a second three-dimensional figure; and
a second access code packaged with the second figure; wherein
the gaming platform is adapted to allow play of a second character in the game responsive to the second access code being entered into the gaming platform.

48. The gaming system of claim 47, wherein the first character has an appearance which is similar to the first figure.

49. The gaming system of claim 47, wherein the first primary access code is written on the first figure.

50. The gaming system of claim 47, wherein the gaming platform comprises a computer network.

51. The gaming system of claim 50, wherein the computer network is the Internet.

52. The gaming system of claim 47, wherein the gaming platform is a sports game.

53. The gaming system of claim 47, wherein the gaming platform is a fighting game.

54. The gaming system of claim 47, herein said first character includes a characteristic including one or more of attributes, powers, weapons, equipment, experience points, levels, feats, strengths, and/or weaknesses.

55. A method of playing a game comprising the steps of:
manually inputting a first primary access code into a user interface of a computer that is operating to play the game, where said first primary access code is packaged with a first three-dimensional figure that has a form selected from the group consisting of human, superhero, animal, god, mythical person, mythical beast, and robot;
playing an electronic game using the computer, utilizing a first character resulting from said inputting of the first primary access code;
manually inputting a secondary access code into the user interface of the computer, where said secondary access code is packaged with a figure accessory; and
the computer operating the electronic game changing a characteristic of the character in a way that changes a chance of success of the first character in said playing a game, as a result of said inputting the secondary access code, wherein
the gaming platform further comprises programming which causes play to end automatically after a predetermined period of time, wherein
the gaming platform further comprises programming which allows said game play to resume responsive to a secondary access code being manually entered into the gaming platform.

* * * * *

UNITED STATES PATENT AND TRADEMARK OFFICE
CERTIFICATE OF CORRECTION

| | |
|---|---|
| PATENT NO. | : 7,862,428 B2 |
| APPLICATION NO. | : 10/884002 |
| DATED | : January 4, 2011 |
| INVENTOR(S) | : Michael D. Borge |

Page 1 of 1

It is certified that error appears in the above-identified patent and that said Letters Patent is hereby corrected as shown below:

Column 4, line 22 "active action FIG. 10 for use with Internet gaming platforms" should read --active action figure 10 for use with Internet gaming platforms--

Column 4, line 35 "Preferably, the invented interactive action FIG. 10 may" should read --Preferably, the invented interactive action figure 10 may--

Column 4, line 66 "active action FIG. 10 on the Internet is depicted in FIG. 2. This" should read --active action figure 10 on the Internet is depicted in FIG. 2. This--

Column 4, line 67 "action FIG. 10 is shown in FIG. 3 in his basic form, with two" should read --action figure 10 is shown in FIG. 3 in his basic form, with two--

Column 5, line 5 "the action FIG. 10 in FIG. 3 and the game character 30 of FIG." should read --the action figure 10 in FIG. 3 and the game character 30 of FIG.--

Signed and Sealed this
Twenty-eighth Day of August, 2012

David J. Kappos
*Director of the United States Patent and Trademark Office*